United States Patent [19]

Kelley

[11] Patent Number: 5,129,497
[45] Date of Patent: Jul. 14, 1992

[54] TORQUE LIMITING CLUTCH

[75] Inventor: Reginald D. Kelley, Lebanon, Ohio

[73] Assignee: Force Control Industries, Inc., Fairfield, Ohio

[21] Appl. No.: 735,832

[22] Filed: Jul. 25, 1991

[51] Int. Cl.⁵ .............................................. F16D 7/02
[52] U.S. Cl. ............................ 192/56 R; 192/70.12; 464/48
[58] Field of Search .................... 192/56 R, 70.12; 464/48

[56] References Cited

U.S. PATENT DOCUMENTS

| | | | |
|---|---|---|---|
| 2,593,521 | 4/1952 | Ball | 192/70.2 X |
| 2,755,642 | 7/1956 | Gilbert | 464/48 X |
| 4,089,396 | 5/1978 | Quick | 192/56 F |
| 4,617,003 | 10/1986 | Bober et al. | 464/48 |
| 4,645,472 | 2/1987 | Heidenreich | 464/48 |
| 4,648,494 | 3/1987 | Yater | 192/18 A |
| 4,661,083 | 4/1987 | Heidenreich et al. | 192/56 R X |
| 4,860,862 | 8/1989 | Yater et al. | 192/18 A |
| 5,002,517 | 3/1991 | Heidenreich et al. | 464/48 |

FOREIGN PATENT DOCUMENTS 285620 7/1915 Fed. Rep. of Germany ........ 464/48

*Primary Examiner*—Leslie A. Braun
*Assistant Examiner*—Nicholas Whitelaw
*Attorney, Agent, or Firm*—Jacox & Meckstroth

[57] ABSTRACT

A hub member receives a tapered collet for gripping a drive shaft such as a shaft projecting from an electric motor. The hub member extends into a surrounding cylindrical housing which is secured to rotate with the hub member and carries a set of generally square clutch plates. An annular drive member is supported for relative rotation by the hub member and has an inner portion projecting into the housing to support a set of annular clutch disks which interfit between the clutch plates. The housing encloses oil which circulates between the clutch plates and disks, and a set of rotary seals confine the oil within the housing while providing for rotation of the drive member relative to the hub member and housing. The drive member has external teeth for driving a load through an endless belt or gears, and the housing encloses a set of compression springs which normally urge the stack of clutch plates and disks together for transmitting a selectable maximum torque from the drive shaft to the drive member through the hub member and housing.

14 Claims, 1 Drawing Sheet

TORQUE LIMITING CLUTCH

BACKGROUND OF THE INVENTION

The present invention is directed to a torque limiting clutch of the general type disclosed in U.S. Pat. Nos. 4,089,396 and 4,661,083 and which are designed to transmit up to a predetermined torque from a drive member to a driven member and slip when the predetermined torque is exceeded. For example, when the driven components jam, the clutch slips to prevent the inertia of the motor rotor and shaft from damaging the drive components.

In such a torque limiting or overload clutch, it is usually desirable for the clutch to mount directly onto a motor shaft and to be removable from the shaft without disassembly of the clutch. It is also desirable for the clutch to slip at a substantially constant preselected torque without fading and to provide a long and dependable service life. In addition, it is desirable for the clutch to minimize the mass which rotates with the driven components for minimizing the inertia during a jam and thereby avoid overloading or overstressing the driven components. It has also been found desirable for a torque limiting clutch to be adjustable to provide for selecting from different available torque settings according to the protection required by the components driven through the clutch.

SUMMARY OF THE INVENTION

The present invention is directed to an improved torque limiting clutch which provides all of the desirable features mentioned above and, in addition, is compact and easy to install and remove from the motor or drive shaft. The torque limiting clutch of the invention also uses oil for cooling a stack of clutch disks and plates and for producing oil shear between the disks and plates to provide an extended service life, for example, as provided by the clutch-brake units disclosed in U.S. Pat. Nos. 4,648,494 and 4,860,862 which issued to the assignee of the present invention.

In accordance with a preferred embodiment of the invention, the above features and advantage are provided by a torque limiting clutch which includes a hub member having a tapered bore receiving a mating collet for releasably gripping the projecting end portion of a motor shaft. The hub member projects into a surrounding cylindrical housing an is secured to a removable outer end wall or cover of the housing so that the housing rotates with the hub member and the motor shaft. The housing carries a set of generally square clutch plates which interfit between a set of annular clutch disks splined to an inner portion of an annular drive member supported for rotation relative to the housing and hub member by a bearing mounted on the hub member. The drive member has external teeth for engaging an endless drive belt or gear, and rotary seals confine a supply of cooling and lubricating oil within the housing for recirculation as an oil shear film between the clutch plates and disks. The stack of clutch plates and disks are normally compressed together by a set of circumferentially spaced and axially extending compression springs supported within the housing by corresponding guide pins.

Other features and advantages of the invention will be apparent from the following description, the accompanying drawing and the appended claims.

DESCRIPTION OF THE PREFERRED EMBODIMENT

Figure 1:
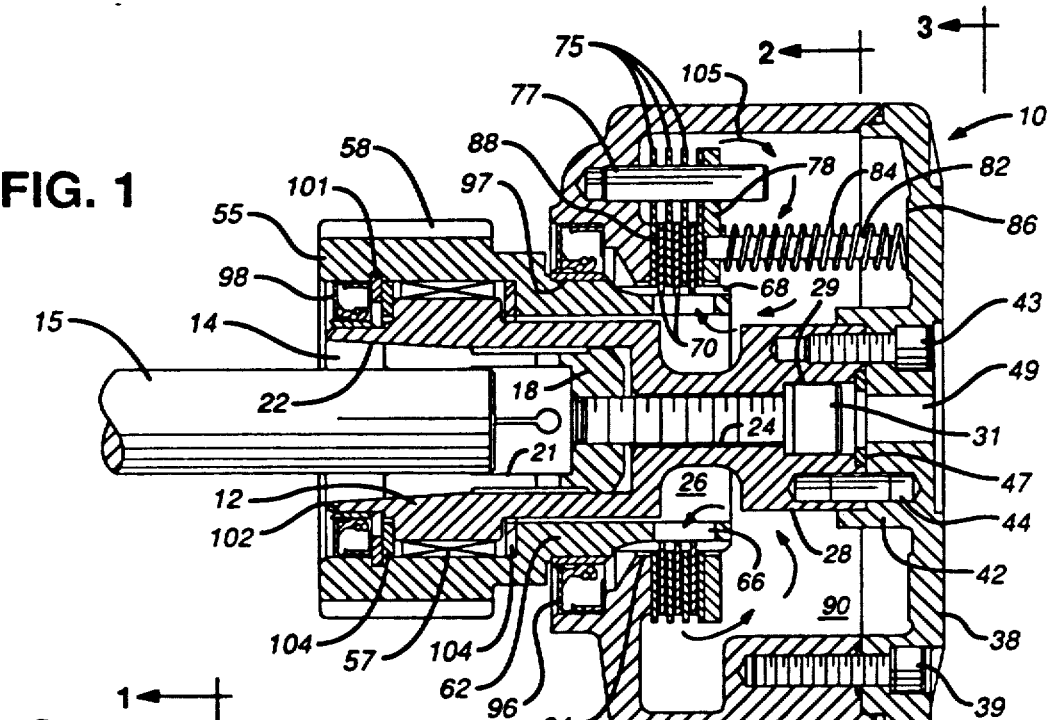
FIG. 1 is an axial section of a torque limiting clutch constructed in accordance with the invention and taken generally on the line 1—1 of FIG. 2.

FIG. 1 illustrates a torque limiting clutch 10 which includes a tubular hub member 12 defining a bore 14 for receiving the end portion of a shaft 15, such as a shaft projecting from an electric motor. The bore 14 receives a split collet 18 having four arcuate sections 21 with tapering outer portions conforming to a tapered surface 22 defining part of the bore 14. The hub member 12 includes a reduced tubular neck portion 24 which defines the circumferential recess or cavity 26, and an outer end portion 28 of the hub member 12 has a counterbore 29 for receiving a socket head cap screw 31 which extends through the neck portion 24 and is threaded into the inner end portion of the tapered collet 18. After the motor shaft 15 is inserted into the collet 18, the screw 31 is tightened to move the collet 18 to the right (FIG. 1) and thereby positively secure the hub member 12 to the shaft 15.

A cylindrical housing 35 includes an annular portion 36 secured to an end wall or cover portion 38 by a set of four circumferentially spaced cap screws 39. The end wall portion 38 includes a hub portion 42 which has a counterbore for receiving the adjacent end portion 28 of the hub member 12. A set of three cap screws 43 secure the end wall portion 38 to the end portion 28 of the hub member 12, and a set of three dowel pins 44 transfer torque from the hub member 12 to the housing 35. A metal washer 47 is confined within a groove between the hub portion 42 and the inner portion 28 and has an inner diameter slightly smaller than the outer head diameter of the retaining cap screw 31. The housing end wall portion 38 has a center hole 49 for receiving an Allen wrench (not shown) for engaging the socket head cap screw 31. When it is desirable to remove the hub from shaft 15, the screw 31 is unthreaded until the head portion engages the washer 47 after which further rotation of the screw 31 moves the collet member 18 axially to the left (FIG. 1), thereby releasing the hub member 12 from the shaft 15.

An annular or tubular drive member 55 is supported for rotation by a bronze sleeve bearing 57 mounted on the hub member 12, and the drive member 55 has peripherally spaced teeth 58 for receiving a timing belt (not shown) which is connected to drive the driven components or load. The drive member 55 includes a reduced inner portion 62 which projects into a circular opening 64 within the annular housing portion 36 and surrounds a portion of the annular cavity 26 within the hub member 12. A set of four circumferentially spaced slots 66 are formed within the inner portion 62 of the drive member 55, and the slots 66 extend to an external spline 68 formed on the inner portion 62 of the drive member 55.

Figure 2:
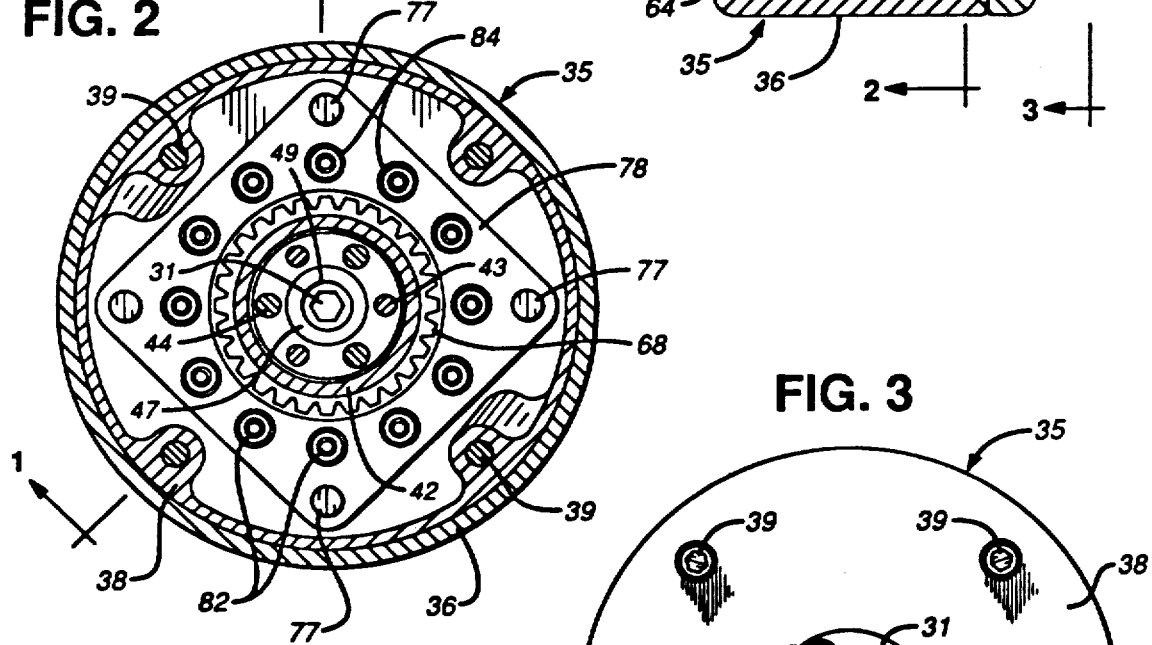
FIG. 2 is a reduced section taken generally on the line 2—2 of FIG. 1.

A set of three annular clutch disks 70 are connected by the spline 68 to the drive member 55 for rotation with the drive member and for axial movement, and the clutch disks 70 are confined between a set of four generally square clutch plates 75. As shown in FIG. 2, the corner portions of the clutch plates 75 have aligned holes for receiving a set of four cylindrical pins 77 which are secured to the housing portion 36 and project axially into the housing so that the clutch plates 75 rotate with the housing along with a similarly shaped thrust plate 78. The thrust plate 78 supports a set of twelve circumferentially spaced guide or roll pins 82 each of which receives a long compression spring 84. The spring 84 extend between a flat annular surface 86 within the housing end wall portion 38 and the flat generally square thrust plate 78 so that the springs normally compress or clamp the stack of clutch disks 70 and clutch plates 75 between the thrust plate 78 and a flat annular surface 88 formed within the housing portion 36.

Figure 3:
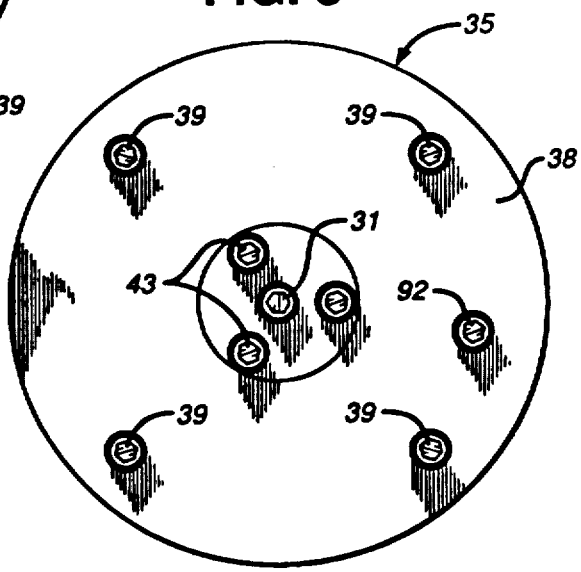
FIG. 3 is a reduced axial end view of the clutch, taken generally on the line 3—3 of FIG. 1.

An annular chamber 90 is defined between the housing 35 and the inner portion 28 of the hub member 12 and is adapted to receive a supply of oil through a threaded port normally closed by a threaded plug 92 (FIG. 3). When the plug 92 is removed and the chamber 90 is filled with oil to the bottom of the threaded port, approximately forty percent of the chamber 90 is filled with oil. An annular rotary seal 96 is confined within a counterbore within the housing portion 36 and engages a hardened wear sleeve 97 pressed onto the annular drive member 55 to form a fluid-tight rotary seal between the housing 35 and the drive member 55. A similar annular rotary seal 98 is confined within the outer end portion of the drive member 55 adjacent a retaining ring 101 and engages a hardened wear sleeve 102 pressed onto the outer end portion of the hub member 12 to form a rotary fluid-tight seal between the hub member 12 and drive member 55. A pair of bronze thrust washers 104 confine the bronze sleeve bearing 57 and position the drive member 55 axially with respect to the hub member 12.

In operation of the torque limiting clutch 10, the annular drive member 55 normally rotates with the drive shaft 15 by torque transferred through the housing 35 and hub member 12. As the housing 35 rotates, the oil within the chamber 90 recirculates, as shown by the arrows 105, due to the centrifugal forces on the oil by the clutch disks 70 and clutch plates 75. Preferably, the opposite faces of each of the clutch disks 70 has radial or outwardly extending grooves to form small oil passages between the clutch disks 70 and clutch plates 75 when the stack is compressed together by the springs 84.

In the event the drive member 55 and the components being driven by the drive member are stopped due to a jam or encounter an excessive resistance, the clutch plates 75 continue to rotate and slip relative to the clutch disks 70 and thereby prevent overloading of the machinery being driven. The maximum torque transfer to the clutch disks 70 by the clutch plates 75 is controlled by the compressive force exerted by the springs 84. This force may be reduced simply by removing two or more springs 84 springs 84 after the housing end wall portion 38 is removed or by using springs having different spring rates.

From the drawing and the above description, it is apparent that a torque limiting clutch or overload clutch constructed in accordance with the present invention, provides desirable features and advantages. For example, when the driven load jams and the clutch slips, the mass of the clutch, including the housing 35, the components within the housing and the hub member 12 continue to rotate with the shaft 15 so that the inertia forces on the driven load is minimized. In addition, the circulating oil provides for cooling the clutch plates and disks by transferring heat to the housing 35 and thereby provides the clutch 10 with a long and dependable service life. The oil also provides for a torque transfer during slippage which is substantially the same as the torque transfer when there is no slippage. Thus there is no torque fade during slippage as is common with dry friction torque limiting clutches. As another feature, the clutch 10 may be conveniently and quickly mounted on the shaft 15 and removed from the shaft simply by turning the cap screw 31 with an Allen wrench. Furthermore, the torque transfer may be conveniently changed to provide for selecting from six different torque settings, for example, between six foot pounds and thirty six foot pounds, simply by removing one or more pairs of springs 84. The clutch 10 is also compact and provides for slippage when the rotation of the motor shaft is started in order to avoid overloading and overstressing the driven components.

While the form of clutch apparatus herein described constitutes a preferred embodiment of the invention, it is to be understood that the invention is not limited to this precise form of clutch apparatus, and that changes may be made therein without departing from the scope and spirit of the invention as defined in the appended claims.

The invention having thus been described, the following is claimed:

1. An improved torque limiting clutch unit adapted to mount on a motor shaft, comprising an input hub member including an inner end portion and an annular outer end portion defining a bore for receiving the shaft, means for securing said outer end portion to the shaft for rotation of said hub member with the shaft, a housing surrounding said inner end portion of said hub member and having an outer end wall secured to said inner end portion of said hub member for rotation of said housing with said hub member and the shaft, said housing defining a chamber for receiving a predetermined volume of cooling and lubricating oil, an annular output drive member surrounding said hub member and including an inner end portion projecting into said housing around said inner end portion of said hub member, said drive member also including an outer end portion surrounding said outer end portion of said hub member and having means for driving a load, bearing means supported by said hub member and supporting said drive member for rotation relative to said hub member and said housing, a set of annular seals disposed between said drive member and said hub member and said housing for confining the oil within said housing chamber, a set of interfitting annular clutch plates and annular clutch disks within said housing and surrounding said inner end portion of said drive member, means for connecting said clutch plates to said housing for rotation therewith, means for securing said clutch disks to said inner portion of said drive member for rotation therewith, spring means within said housing for rotation therewith and positioned for normally compressing said clutch disks and clutch plates together, and said clutch disks being effective to rotate within said housing and relative to said clutch plates in response to a predetermined torque resistance applied to said output drive member by the load.

2. A clutch unit as defined in claim 1 wherein said housing is generally cylindrical and has an outer diameter larger than said annular drive member.

3. A clutch unit as defined in claim 1 wherein said hub member cooperates with said housing to define an annular said chamber.

4. A clutch unit as defined in claim 1 wherein said housing includes an annular cup-shaped portion, said outer end wall is removably secured to said cup-shaped portion, and means for removably securing said outer end wall of said housing to said hub member.

5. A clutch unit as defined in claim 1 wherein each of said clutch plates has outwardly projecting portions, and a set of axially extending pins secured to said housing and extending through corresponding opening within said projecting portions of said clutch plates to provide said means for connecting said clutch plates to said housing.

6. A clutch unit as defined in claim 1 wherein said inner end portion of said output drive member has an external spline, means defining circumferentially spaced fluid openings within said inner end portion of said drive member for circulating oil outwardly between said clutch plates and disks, and each of said annular clutch disks has internal teeth engaging said spine.

7. A clutch unit as defined in claim 1 wherein said spring means comprise a plurality of circumferentially spaced and axially extending compression springs, a corresponding plurality of axially extending support pins within said springs and supported by said outer end wall of housing, and each said spring having a length greater than the stack width of said clutch plates and disk to provide a substantially constant compressing force independent of any wear on said clutch plates and disks.

8. A clutch unit as defined in claim 1 wherein said inner end portion of said drive member defines passages for directing oil into said annular clutch plates and disks to provide an outward flow of oil between said plates and disks in response to rotation of said housing.

9. A clutch unit as defined in claim 8 wherein said inner portion of said hub member defines an annular cavity for directing oil into said passages.

10. An improved torque limiting clutch unit adapted to mount on a motor shaft, comprising an input hub member including an inner end portion and an annular outer end portion defining a bore for receiving the shaft, means for securing said outer end portion to the shaft for rotation of said hub member with the shaft, a housing surrounding said inner end portion of said hub member and having an outer end wall secured to said inner end portion of said hub member for rotation of said housing with said hub member and the shaft, said housing defining a chamber for receiving a predetermined volume of cooling and lubricating oil, an annular output drive member surrounding said hub member and including an inner end portion projecting into said housing around said inner end portion of said hub member, said drive member also including an outer end portion surrounding said outer end portion of said hub member and having means for driving a load, bearing means supported by said hub member and supporting said drive member for rotation relative to said hub member and said housing, a set of annular seals disposed between said drive member and said hub member and said housing for confining the oil within said housing chamber, a set of annular clutch members within said housing an surrounding said inner end portion of said drive member, means for connecting one of said clutch members to said housing for rotation therewith, means for securing a second of said clutch members to said inner portion of said drive member for rotation therewith, spring means within said housing for rotation therewith and positioned for normally compressing said clutch members together, and said second clutch member being effective to rotate within said housing and relative to said one clutch member in response to a predetermined torque resistance applied to said output drive member by the load.

11. A clutch unit as defined in claim 10 wherein said inner portion of said drive member defines circumferentially spaced passages for directing oil into said annular clutch members to provide an outward flow of oil between said clutch members in response to rotation of said housing.

12. A clutch unit as defined in claim 10 wherein said means for connecting said hub member to the shaft comprise an axially movable collet within said bore and surrounding the shaft, said collet and said hub member having mating tapered surfaces, a screw extending axially within said hub member and treadably engaging said collet, and said housing end wall defining a center opening to provide for rotating said screw with a wrench.

13. An improved torque limiting clutch unit adapted to mount on a motor shaft, comprising an input hub member including an inner end portion and an annular outer end portion defining a bore for receiving the shaft, a housing surrounding said inner end portion of said hub member and having an outer end wall secured to said inner end portion of said hub member for rotation of said housing with said hub member and the shaft, an axially movable collet extending within said bore and surrounding the shaft, said collet and said hub member having mating tapered surfaces, a screw extending axially within said hub member and treadably engaging said collet, said housing end wall defining a center opening to provide for rotating said screw with a wrench to tighten said collet between said hub member and the shaft, said housing defining a chamber for receiving a predetermined volume of cooling and lubricating oil, an annular output drive member surrounding said hub member and including an inner end portion projecting into said housing around said inner end potion of said hub member, said drive member also including an outer end portion surrounding said outer end portion of said hub member and having means for driving a load, bearing means supported by said hub member and supporting said drive member for rotation relative to said hub member and said housing, a set of annular seals disposed between said drive member and said hub member and said housing for confining the oil within said housing chamber, a set of interfitting annular clutch plates and annular clutch disks within said housing and surrounding said inner end portion of said drive member, means for connecting said clutch plates to said housing for rotation therewith, means for securing said clutch disks to said inner portion of said drive member for rotation therewith, spring means within said housing for rotation therewith and positioned for normally compressing said clutch disks and clutch plates together, and said clutch disks being effective to rotate within said housing and relative to said clutch plates in response to a predetermined torque resistance applied to said output drive member by the load.

14. A clutch unit as defined in claim 13 and including means for restraining axial movement of said screw in response to untightening said screw from said collet for releasing said collet from said hub member and the shaft.

* * * * *